US 007781505B2

(12) United States Patent
Cook et al.

(10) Patent No.: US 7,781,505 B2
(45) Date of Patent: Aug. 24, 2010

(54) PROCESS OF STABILISING SILOXANE POLYMERS

(75) Inventors: Leon Cook, Midland, MI (US); Sue Strange, Midland, MI (US); Iain Mackinnon, Sully Penarth (GB); Sarah O'Hare, NR. Barry (GB)

(73) Assignee: Dow Corning Corporation, Midland, MI (US)

( * ) Notice: Subject to any disclaimer, the term of this patent is extended or adjusted under 35 U.S.C. 154(b) by 546 days.

(21) Appl. No.: 11/630,096

(22) PCT Filed: Jun. 17, 2005

(86) PCT No.: PCT/US2005/021449

§ 371 (c)(1),
(2), (4) Date: Dec. 19, 2006

(87) PCT Pub. No.: WO2006/014229

PCT Pub. Date: Feb. 9, 2006

(65) Prior Publication Data

US 2007/0299178 A1    Dec. 27, 2007

(30) Foreign Application Priority Data

Jul. 3, 2004   (GB) .................. 0415001.7

(51) Int. Cl.
*C08K 5/24*   (2006.01)
(52) U.S. Cl. ..................... 524/261
(58) Field of Classification Search .................. 524/261
See application file for complete search history.

(56) References Cited

U.S. PATENT DOCUMENTS

| 3,575,917 | A | 4/1971 | Kapral |
| 3,686,357 | A | 8/1972 | Cheeman |
| 4,721,765 | A | 1/1988 | Inoue |
| 5,824,814 | A | 10/1998 | Cray et al. |

FOREIGN PATENT DOCUMENTS

| EP | 0 757 074 B1 | 2/2002 |
| WO | WO 03/016380 A2 | 2/2003 |

*Primary Examiner*—Edward J Cain
(74) *Attorney, Agent, or Firm*—Alan Zombeck

(57) ABSTRACT

A process for stabilising the viscosity of an amino-functional siloxane polymer comprises adding a dialkoxydialkylsilane to the amino-functional siloxane polymer or to the reagents from which the amino-functional siloxane polymer is produced.

7 Claims, No Drawings

PROCESS OF STABILISING SILOXANE POLYMERS

CROSS REFERENCE TO RELATED APPLICATIONS

This application is a U.S. national stage filing under 35 U.S.C. §371 of PCT Application No. PCT/US2005/021449 filed on 17 Jun. 2005, currently pending, which claims the benefit of G.B. Patent Application No. 0415001.7 filed 3 Jul. 2004. PCT Application No. PCT/US2005/021449 and G. B. Patent Application No. 0415001.7 are hereby incorporated by reference.

FIELD OF THE INVENTION

This invention relates to a process of stabilising siloxane polymers, and in particular stabilising the viscosity of amino-functional siloxane polymers.

BACKGROUND TO THE INVENTION

Amine functionality is catalytically active towards silanol condensation. If an aminofunctional siloxane is prepared with an appreciable silanol content, the viscosity of the polymer will tend to rise as the silanol groups condense to form siloxane bonds under the influence of the amine functionality.

EP-B-757074 describes a process for stabilising the viscosity of siloxane polymer formed by condensation polymerisation which process comprises adding a substituted or unsubstituted alcohol to organo-silicon compounds used to produce the siloxane polymer by condensation polymerisation, the alcohol being of the general formula R'OH, wherein R' is a substituted or unsubstituted alkyl group of from 4 to 30 carbon atoms.

U.S. Pat. No. 3,575,917 describes stabilizing against gelation a mixture of an organopolysiloxane and an organometallic curing catalyst which comprises incorporating in said mixture from 0.1 to 0.3% of an organic silane of the formula (ZAlk)zSi(OX)4−z, in which Z is hydrogen, amino, N-beta-aminoethyl, 1,2-epoxy or glycidoxy; Alk is a 2-6C bivalent or trivalent hydrocarbon radical; X is 1-10C alkyl, aryl, aralkyl or alkaryl; and z=1-3; and sufficient amine to maintain the pH at 7 to 9.

SUMMARY OF THE INVENTION

In a process according to the invention for stabilising the viscosity of an amino-functional siloxane polymer, a dialkoxydialkylsilane or alkyltrialkoxysilane is added to the amino-functional siloxane polymer or to the reagents from which the amino-functional siloxane polymer is produced.

Thus according to one aspect of the invention the dialkoxydialkylsilane or alkyltrialkoxysilane is added to the already formed amino-functional siloxane polymer.

According to another aspect of the invention, a process for the preparation of an amino-functional siloxane polymer comprises reacting an aminosilane or aminosiloxane (A) which contains an aminoalkyl group and at least one alkoxy group bonded to Si with a silanol-functional polysiloxane (B), characterized in that the dialkoxydialkylsilane or alkyltrialkoxysilane is added to the reagents (A) and/or (B) before or during the reaction of (A) and (B), whereby an amino-functional siloxane polymer of improved viscosity stability is produced.

DETAILED DESCRIPTION OF THE INVENTION

The amino-functional siloxane polymer is typically of the general formula

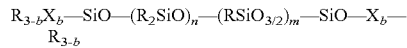

wherein each R represents a hydrocarbon group or a substituted hydrocarbon group with the proviso that at least one R per molecule represents aminoalkyl, each X represents a group R, a hydroxyl group or an alkoxy group with the proviso that at least one X per molecule represents a hydroxyl group or an alkoxy group, b is 1, 2 or 3, and n and m are integers with a value such that the viscosity of the siloxane polymer at 25° C. is in the range from 1 to 100,000 mPa·s. Suitable R groups include alkyl, alkenyl, aryl, cycloalkyl or groups substituted with amine, amide, ether or epoxy functionality, provided that at least one R group per molecule is a silicon-bonded group having amine substitution, e.g. aminoalkyl. Preferably at least 80% of all R groups are alkyl group having up to 5 carbon atoms, most preferably methyl groups. Preferably n is an integer with a value such that the viscosity of the siloxane polymer at 25° C. is 20 to 60,000 mPa·s, more preferably 50 to 5,000 mPa·s, most preferably 100 to 1,500 mPa·s.

Such an amino-functional siloxane polymer can be prepared by reacting an aminosilane or aminosiloxane (A) which contains an aminoalkyl group and at least one alkoxy group bonded to Si with a silanol-functional polysiloxane (B) in a condensation reaction.

The aminosilane (A) contains an aminoalkyl group and at least one alkoxy group bonded to Si. The aminoalkyl group is preferably of the formula R'—(NH-A')$_q$-NH-A- wherein A and A' are each independently a linear or branched alkylene group having 1 to 6 carbon atoms and optionally containing an ether linkage; q=0-4; R' is hydrogen or an alkyl or hydroxyalkyl group having 1 to 4 carbon atoms. Most preferably R' is hydrogen; q=0 or 1; and A and A' (if present) each contain 2 to 4 carbon atoms. Examples of preferred aminoalkyl groups include —(CH$_2$)$_3$NH$_2$, —(CH$_2$)$_4$NH$_2$, —(CH$_2$)$_3$NH(CH$_2$)$_2$NH$_2$, —CH$_2$CH(CH$_3$)CH$_2$NH(CH$_2$)$_2$NH$_2$, —(CH$_2$)$_3$NHCH$_2$CH$_2$NH(CH$_2$)$_2$NH$_2$, —CH$_2$CH(CH$_3$)CH$_2$NH(CH$_2$)$_3$NH$_2$, —(CH$_2$)$_3$NH(CH$_2$)$_4$NH$_2$ and —(CH$_2$)$_3$—O—(CH$_2$)$_2$NH$_2$. The alkoxy group bonded to Si can contain an unreactive substituent or linkage such as an ether linkage. The aminosilane (A) preferably has the formula

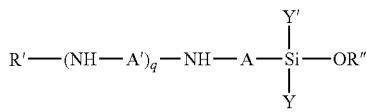

wherein A, A', q and R' are defined as above; R" is an alkyl or alkoxyalkyl group having 1 to 6 carbon atoms, for example, methyl, ethyl, butyl or methoxyethyl; and Y and Y' are each independently a group —OR" or an optionally substituted alkyl or aryl group. Most preferably, for the preparation of linear polydiorganosiloxanes, the group Y of aminosilane (A) is an unsubstituted alkyl group such as methyl and the group Y' is of the formula —OR", preferably methoxy or ethoxy, although silanes where 3 silicon-bonded alkoxy groups are present may be preferred as they tend to be more reactive. Examples of preferred aminosilanes (A) are aminoethyl-aminoisobutyl methyl dimethoxy silane $(CH_3O)_2(CH_3)Si—CH_2CH(CH_3)CH_2NH(CH_2)_2NH_2$, aminopropyl methyl diethoxy silane $(C_2H_5O)_2(CH_3)Si—(CH_2)_3NH_2$, dimethyl methoxy aminopropyl silane, methyl dimethoxy aminoethylaminopropyl silane, trimethoxy aminopropylsilane, methyl dimethoxy aminopropyl silane and trimethoxy aminoethylaminopropyl silane.

The silanol-functional polysiloxane (B) is preferably a linear hydroxyl-tipped polydiorganosiloxane. It can for example be a linear hydroxyl-tipped polydimethylsiloxane, preferably a liquid polydimethylsiloxane of degree of polymerisation 4-1000, most preferably 10-100. Alternatively the polysiloxane (B) can contain 2-30C alkyl, for example, ethyl, propyl, pentyl or hexyl, substituted alkyl, for example fluoroalkyl such as 3,3,3-trifluoropropyl, or alkenyl, for example vinyl, allyl or hexenyl, groups or aryl, for example phenyl, or aralkyl, for example 2-phenylpropyl, groups bonded to Si. Such groups may for example be present as $—Si(CH_3)R^*—O—$ units, where $R^*$ is 2-30C alkyl or alkenyl, aryl or aralkyl, or as $—Si(R^*)_2—O—$ units. Preferably at least 80% of the total silicon-bonded substituents are methyl groups.

The amount of silanol-functional polysiloxane (B) used is generally sufficient that the molar ratio of silanol groups of (B) to Si-bonded alkoxy groups of aminosilane (A) is greater than 0.5:1 and preferably greater than 1:1. This ensures that chain extension polymerisation takes place, rather than merely capping of the silanol-functional polysiloxane (B) by the amino-functional alkoxysilane (A). The molar ratio of silanol groups of (B) to Si-bonded alkoxy groups of aminosilane (A) is preferably in the range 1-3:1.

The reaction between aminosilane or aminosiloxane (A) and silanol-functional polysiloxane (B) is preferably carried out in the presence of a condensation catalyst, for example an alkali catalyst such as KOH, barium hydroxide, sodium phosphate or potassium tetra-borate or a mixtures of two or more of these, or an acid catalyst such as sodium dodecyl benzene sulphonate or HCl. The catalyst can be a carboxylic acid, which reacts with the aminosilane (A) to form a carboxylate salt which is believed to be the effective catalyst as described in WO-A-03/016380. Examples of suitable carboxylic acids are aliphatic carboxylic acids having 6 to 20 carbon atoms, for example octanoic, decanoic or lauric acid, or carboxylic acids substituted by an electron-withdrawing moiety, for example lactic acid or a fluoroalkanoic acid such as fluoroacetic acid or 4,4,4-trifluorobutanoic acid. The catalyst is preferably used at 0.01-5, particularly 0.1 or 0.2 up to 1.0 or 2.0,% by weight based on the aminosilane (A).

The reaction between the aminosilane (A) and silanol-functional polysiloxane (B) can in general be carried out at any temperature in the range 0-200° C. Temperatures of at least 50° C. are preferred, most preferably from 60° C. up to 120 or 140° C. The reaction can in general be carried out at pressures in the range from 5 mbar up to 5 bar, for example at ambient pressure; it is frequently preferred that at least the later part of the reaction is carried out under reduced pressure, for example 10 to 400 mbar, particularly if there is a need to promote removal of volatile by-product (such as methanol or ethanol evolved from the amino-functional alkoxysilane) from the reaction system. The reaction can conveniently be carried out undiluted in the liquid phase.

The preferred additive is a dialkoxydialkylsilane. The dialkoxydialkylsilane is generally of the formula $Z_2Si(OZ')_2$, where each Z represents an alkyl group having 1 to 4 carbon atoms and each Z' represents an alkyl group having 1 to 4 carbon atoms. Preferably each Z represents an alkyl group having 1 or 2 carbon atoms and each Z' represents an alkyl group having 1 or 2 carbon atoms. For example the dialkoxydialkylsilane can be dimethoxydimethylsilane or diethoxydimethylsilane. If an alkyltrialkoxysilane is added, it is generally of the formula $YSi(OY')_3$, where Y represents an alkyl group having 1 to 4 carbon atoms and each Y' represents an alkyl group having 1 to 4 carbon atoms. Preferably Y represents an alkyl group having 1 or 2 carbon atoms and each Y' represents an alkyl group having 1 or 2 carbon atoms. For example the alkyltrialkoxysilane can be methyltrimethoxysilane or methyltriethoxysilane.

The dialkoxydialkylsilane or alkyltrialkoxysilane can be added to either of the reagents (A) or (B), or to both (A) and (B), before the reaction of (A) and (B), or can be added at an intermediate stage during the reaction of (A) and (B), or can be added to the amino-functional siloxane polymer reaction product. Addition to the reaction mixture used to produce the amino-functional siloxane polymer has been found to give maximum control of viscosity, but we have found dimethoxydimethylsilane, for example, to be effective at controlling the viscosity drift of an amino-functional siloxane polymer fluid either when added to the reaction mixture used to produce the fluid or when post added to the fluid.

The amount of dialkoxydialkylsilane or alkyltrialkoxysilane added is generally in the range 0.1 to 10% based on the total weight of reagents (A) and (B) or on the weight of the preformed amino-functional siloxane polymer, preferably 0.2 to 6% by weight.

We believe that the dialkoxydialkylsilane acts as a co-endblocker in the amino functional siloxane polymers. Surprisingly, there is a marked difference in the reactivity of the two methoxy groups of the dimethydimethoxy silane. The first methoxy group allows the silane to act as an endblocker while the second retains its reactivity and is as such available for subsequent reactions, thereby controlling the viscosity drift of the amino polymer while maintaining the reactivity of the polymer. A similar difference is seen in the reactivity of the three alkoxy groups of an alkyltrialkoxysilane, with the first alkoxy group acting rapidly as an endblocker.

The process of the present invention has the advantage over the process of EP-A-757074 that the dialkoxydialkylsilane or alkyltrialkoxysilane does not introduce any new groups into the amino-functional siloxane polymer or into the reaction forming it. Alkyl and alkoxy groups in the polymer, and alcohol, e.g. methanol driven off during the reaction, are similar to those resulting from aminosilane (A). Alternatively a dialkoxydialkylsilane or alkyltrialkoxysilane can be used according to the present invention in addition to an alcohol having from 4 to 30 carbon atoms, particularly a fatty alcohol, as described in EP-A-757074.

The amino-functional siloxane polymer may be provided as a homogeneous liquid composition, or as an emulsion which can be produced by standard emulsification techniques. The amino-functional siloxane polymer can in general be used in the textile industry as fibre lubricants, for example for polyester, polyamide, acrylic, cotton or wool fibres, and as fabric softeners and/or anti-wrinkle agents, and can be used in the personal care industry as hair conditioners and in hair shampoos or skin care compositions, and can also be used as ingredients of polishes or protective coatings.

The invention is illustrated by the following Examples

EXAMPLE 1

24.66 kg linear silanol end-blocked polydimethylsiloxane with a viscosity of approximately 60 mPa·s was charged to a reaction vessel. Agitation was started and the reactor contents were heated to 100° C. 342.5 g 3-(2-aminoethylamino)-2-methylpropyl methyl dimethoxy silane and 25 g octanoic acid were charged and the reactor contents were maintained at reflux for 3 hours. Vacuum was applied to the reactor to a pressure of 100 mbar while continuing heating at 100° C. for 4 hours. The viscosity of the amino-functional siloxane polymer produced at this stage was 4500 mPa·s.

The vacuum was broken with nitrogen and the reactor was re-set for total reflux and cooled to 85° C. 250 g dimethoxydimethylsilane was added and the reaction was held at 85° C., refluxing, for 60 mins. Vacuum was then re-applied and pressure was gradually reduce to 200 mbar. After 30 mins at 200 mbar the vacuum was broken with nitrogen and the reaction was cooled to less than 50° C.

EXAMPLE 2

An amino-functional siloxane polymer was produced by the method of Example 1 but replacing the 3-(2-aminoethylamino)-2-methylpropyl methyl dimethoxy silane by 322.5 g 3-(2-aminoethylamino)propyl methyl dimethoxy silane.

COMPARATIVE EXAMPLES 1 AND 2

Amino-functional siloxane polymers were produced according to Examples 1 and 2 but without the steps of adding dimethoxydimethylsilane and subsequent reaction.

For each of Examples 1 and 2 and Comparative Examples 1 and 2, the viscosity of the amino-functional siloxane polymer product was measured at 25° C. The degree of polymerisation DP was calculated by $^{29}$Si NMR and the number average molecular weight Mn was measured by gas permeation chromatography (GPC), and the DP was also calculated from this. Samples of each of the amino-functional siloxane polymer products were stored at 25° C. and their viscosity in mPa·s was measured after 1 and 2 months. The results are shown in Table 1 below.

TABLE 1

|  | Example 1 | Example 2 | Comparative Example 1 | Comparative Example 2 |
|---|---|---|---|---|
| Initial viscosity | 5,603 | 6,134 | 5,080 | 4,910 |
| Viscosity 1 month | 5,904 | 6,200 | >1,000,000 | >100,000 |
| Viscosity 2 month | 6,828 | 6,523 |  |  |
| DP ($^{29}$Si NMR) | 530 | 644 | 400 | 340 |
| Mn (GPC) | 39,070 | 40,073 | 42,500 | 28,700 |
| DP (GPC) | 530 | 540 | 570 | 390 |
| Appearance | clear and colourless | clear and colourless | pale yellow, slight haze | trace yellow, clear |

It can be seen that the viscosity of the amino-functional siloxane polymers produced in Examples 1 and 2 stayed substantially constant for 1 month, while the viscosity of the amino-functional siloxane polymers produced in Comparative Examples 1 and 2 was unusably high after the same time period. It is clear that the viscosity of the amino-functional siloxane polymer produced in Examples 1 and 2 is increasing over time but was still at a usable level after 2 months.

EXAMPLE 3

In a flask, provided with heating mantle, nitrogen blanket, dropping funnel, thermometer and stirrer, were mixed 515 g of a silanol end-blocked polydimethylsiloxane having an average molecular weight of about 3,500 and a viscosity of 70 mPa·s, 17.2 g of 3-(aminoethyl)-amino-2-methylpropyl methyl dimethoxy silane, 8.9 g of a commercially available fatty alcohol (Acropol 35 from ExxonMobil), 4.8 g of dimethoxydimethylsilane (DMDM), and 0.14% by weight based on the total weight of the mixture of a 25/75 mixture of $Na_3PO_4 \cdot 12H_2O$ and $Ba(OH)_2 \cdot 8H_2O$. The reaction mixture was stirred and heated to 85° C. under reflux for 3 hours. Vacuum was then applied at a pressure of 200 mbar whilst continuing to heat at 85° C. for 2 hours. The viscosity of the amino-functional siloxane polymer produced was 1216 mPa·s.

COMPARATIVE EXAMPLE 3

An amino-functional siloxane polymer was produced by the method of Example 3 but the 4.8 g of DMDM were omitted.

Samples of the amino-functional siloxane polymer products of Example 3 and Comparative Example 3 were stored at 25° C. and their viscosity in mPa·s was measured after 4 weeks. The results are shown in Table 2 below.

TABLE 2

| Sample | Initial Viscosity | Viscosity after 4 weeks |
|---|---|---|
| Example 3 | 1216 | 3357 |
| Comparative Example 3 | 1582 | 6684 |

It can be seen from Table 2 that the addition of DMDM to the initial reaction mixture inhibited the rise in viscosity which was evident despite the use of a fatty alcohol.

EXAMPLE 4

An amino-functional siloxane polymer was produced by the method of Comparative Example 3. This amino-functional siloxane polymer product was divided into five samples and varying amounts of dimethoxydimethylsilane (DMDM) were added; for comparison one sample had no DMDM added. The samples were stored at 25° C. and their viscosity in mPa·s was measured after 1 and 2 weeks. The results are shown in Table 3 below.

TABLE 3

| Sample | Initial Viscosity | Viscosity after 7 days | Viscosity after 14 days |
|---|---|---|---|
| No DMDM | 1315 | 1477 | 1803 |
| 0.44% DMDM | 1273 | 1366 | 1604 |
| 0.88% DMDM | 1091 | 1142 | 1198 |
| 1.66% DMDM | 843 | 564 | 612 |
| 3.33% DMDM | 331 | 147 | 133 |

It can be seen from Table 2 that the addition of DMDM inhibited the rise in viscosity, which was evident despite the addition of a fatty alcohol, with the addition of 0.88% DMDM being particularly effective in maintaining a stable viscosity.

The invention claimed is:

1. A process for stabilising the viscosity of an amino-functional siloxane polymer of the general formula

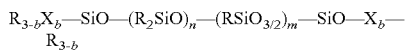

wherein each R represents a hydrocarbon group or a substituted hydrocarbon group with the proviso that at least one R per molecule represents aminoalkyl, each X represents a group R, a hydroxyl group or an alkoxy group with the proviso that at least one X per molecule represents a hydroxyl group, b is 1, 2 or 3, and n and m are integers with a value such that the viscosity of the siloxane polymer at 25° C. is in the range from 1 to 100,000 mPa·s wherein a dialkoxydialkylsilane is added to the amino-functional siloxane polymer or to the reagents (A) and/or (B) from which the amino-functional siloxane polymer is produced before or during the reaction of (A) and (B).

2. A process according to claim 1 wherein 0.2 to 6% by weight of dialkoxydialkylsilane is added based on the amino-functional siloxane polymer.

3. A process according to claim 1, wherein the aminosilane (A) has the formula

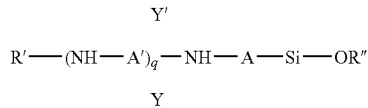

wherein A and A' are each independently a linear or branched alkylene group having 1 to 6 carbon atoms; q=0-4; R' is hydrogen or an alkyl or hydroxyalkyl group having 1 to 4 carbon atoms; R" is an alkyl or alkoxyalkyl group having 1 to 6 carbon atoms; and Y and Y' are each independently a group —OR" or an optionally substituted alkyl or aryl group.

4. A process according to claim 1 wherein the silanol-functional polysiloxane (B) is a linear hydroxyl-tipped polydimethylsiloxane of degree of polymerisation 4-1000.

5. A process according to claim 1 wherein 0.2 to 6% by weight of dialkoxydialkylsilane is added based on the total weight of reagents (A) and (B).

6. A process according to claim 1 in which a dialkoxydialkylsilane is added, wherein the dialkoxydialkylsilane is of the formula $Z_2Si(OZ')_2$, where each Z represents an alkyl group having 1 or 2 carbon atoms and each Z' represents an alkyl group having 1 or 2 carbon atoms.

7. A process according to claim 6, wherein the dialkoxydialkylsilane is dimethoxydimethylsilane.

* * * * *